US009197649B2

(12) United States Patent
Carvalho

(10) Patent No.: US 9,197,649 B2
(45) Date of Patent: Nov. 24, 2015

(54) SYSTEM AND METHOD FOR EMAIL FRAUD RISK ASSESSMENT

(71) Applicant: Reinaldo Carvalho, Chandler, AZ (US)

(72) Inventor: Reinaldo Carvalho, Chandler, AZ (US)

(*) Notice: Subject to any disclaimer, the term of this patent is extended or adjusted under 35 U.S.C. 154(b) by 105 days.

(21) Appl. No.: 14/067,950

(22) Filed: Oct. 31, 2013

(65) Prior Publication Data

US 2014/0150097 A1    May 29, 2014

Related U.S. Application Data

(60) Provisional application No. 61/730,372, filed on Nov. 27, 2012.

(51) Int. Cl.
| | | |
|---|---|---|
| H04L 29/00 | (2006.01) | |
| H04L 29/06 | (2006.01) | |
| H04L 12/58 | (2006.01) | |
| H04L 29/12 | (2006.01) | |

(52) U.S. Cl.
CPC ............... *H04L 63/14* (2013.01); *H04L 51/12* (2013.01); *H04L 51/28* (2013.01); *H04L 51/30* (2013.01); *H04L 63/126* (2013.01); *H04L 61/307* (2013.01)

(58) Field of Classification Search
CPC ................................ H04L 63/14; H04L 51/30
See application file for complete search history.

(56) References Cited

U.S. PATENT DOCUMENTS

| | | | | |
|---|---|---|---|---|
| 2006/0200523 | A1* | 9/2006 | Tokuda et al. | 709/206 |
| 2010/0095377 | A1* | 4/2010 | Krywaniuk | 726/22 |
| 2010/0100957 | A1* | 4/2010 | Graham et al. | 726/22 |

* cited by examiner

*Primary Examiner* — Brandon Hoffman
*Assistant Examiner* — Helai Salehi
(74) *Attorney, Agent, or Firm* — John Alumit

(57) ABSTRACT

Email address Fraud Risk Assessment using a system of data element collection and computation. Data elements for each potion of an email address's local and domain portion is acquired from internal and external data sources, captured, evaluated, and then assigned a value. Data acquisition may include use of domain information, databases, Email Service Providers, Simple Mail Transfer Protocol, corporate and social media services, and search engine services. Using the assigned values, a Fraud Risk Score is computed and then displayed to a user along with additional information, explanations and recommendations.

5 Claims, 4 Drawing Sheets

| Data Element | Condition |
|---|---|
| Domain Existence | Verified and shared |
| Domain Creation Date | Captured and shared |
| Domain Country | Captured and shared |
| Domain Registrar | Captured only |
| Domain Expiration Date | Captured only |
| Date Last Updated | Captured only |
| DNS Server Location | Captured only |
| DNS Admin Phone Number | Captured only |

Fig. 4

| Data Element | Description |
|---|---|
| Email | Confirms the existence of the email |
| Creation Date | Exact date when email was created |
| First Seen Date | First date found associated with the email |
| Last Consultation | Last time email was opened |
| Owner Name | Name associated with email |
| Owner DOB | Date of Birth associated with email |
| Owner Gender | Gender associated with email |
| Owner Location | Location associated with email |
| SM Friends | Social Media friends associated with email |
| Hits | Number of times email was queried |
| U-Hits | Number of times email was queried by different customers |
| Photo | Photo associated with email |

Fig. 5

SYSTEM AND METHOD FOR EMAIL FRAUD RISK ASSESSMENT

CROSS-REFERENCE TO RELATED APPLICATION

This present application claims the benefit of Provisional Application No. 61/730,372 filed Nov. 27, 2012.

FEDERALLY SPONSORED RESEARCH

Not Applicable

SEQUENCE LISTING OR PROGRAM

Not Applicable

BACKGROUND

An "email address" identifies a particular box to which email messages are electronically delivered. Today, email messages and email addresses have become the primary digital identification and communication channel between people, companies and customers. Email communications are relied on to conduct business and to communicate with customers regarding offers or updates to their accounts or services. As email communication has gained widespread use, so too has the occurrence of fraudulent email addresses. Because of the prevalent use of email communication for important and sensitive matters, the accuracy and validity of current and prospective customer email addresses is of utmost importance.

The validation of email address data is an important component when assessing the fraud risk associated with an email address, and data normalization. The solution is found in the present disclosure that comprises a system and methodology for email address fraud risk assessment that collects data elements associated with email addresses from numerous sources, validates and verifies existence of email addresses, calculates and describes the fraud risk indicators for the email addresses.

SUMMARY

The present disclosure is directed to a system and methodology that satisfies the need to collect data elements associated with email addresses from numerous sources, validate and verify existence of email addresses, and to calculate and describe fraud risk indicators for email addresses. In some implementations, email addresses may be verified and validated in queued mode, batch processing, real time, or any other applicable processing methodology.

Implementations of the system and method disclosed herein may provide numerous benefits and advantages for data verification thereby providing greater confidence in the validity and credibility of email data and applications using email address data sets. Email address fraud risk assessment and credibility rating is an innovative and efficient way to confirm the existence of an email address and assess the fraud risk associated with it. This determination in turn can be used to prevent and detect fraud, to serve as an additional layer of protection against fraud incidents, such as for example, for new applications of financial products or services, and in many other areas involving commerce and online transactions.

DRAWINGS

These and other features, aspects, and advantages of the present invention will become better understood with regard to the following description of the preferred embodiments, appended claims, and accompanying drawings.

FIG. 4. illustrates a table of data elements and conditions for the "domain portion" of an email address.

FIG. 5. illustrates a table of data elements and conditions for the "local portion" of an email address.

DESCRIPTION

As shown in FIGS. 1-5, a system and method to assess the email addresses fraud risk is disclosed. Determination of email addresses fraud risk includes verifying the address, comparing and matching it against preexistent lists with both historical and fraud information, and collecting data elements for the domain and local portions of the address. The data elements may be acquired from internal and external data sources, each data element is then assigned a value corresponding to a predetermined scale. By computing the data element values, a Fraud Risk Score is then determined and returned to the user along with additional data elements linked to the email.

One of skill in the art will recognize that the methods of the present disclosure may be implemented as one or more software processes executable by one or more processors and/or one or more firmware applications. The processes and/or firmware are configured to operate on one or more general purpose microprocessors or controllers, a field programmable gate array (FPGA), an application specific integrated circuit (ASIC), or other hardware capable of performing the actions describe above. In an exemplary embodiment of the present invention, a CPU executes software processes to perform the actions of the present disclosure. Additionally, the present invention is not described with reference to any particular programming language. It will be appreciated that a variety of programming languages may be used to implement the teachings of the invention as described herein.

It is also to be understood that the methods may be employed with any form of memory device including all forms of sequential, pseudo-random, and random access storage devices. Storage devices as known within the current art include all forms of random access memory, magnetic and optical tape, magnetic and optical disks, along with various other forms of solid-state mass storage devices. The current invention applies to all forms and manners of memory devices including, but not limited to, storage devices utilizing magnetic, optical, and chemical techniques, or any combination thereof.

Figure 1:
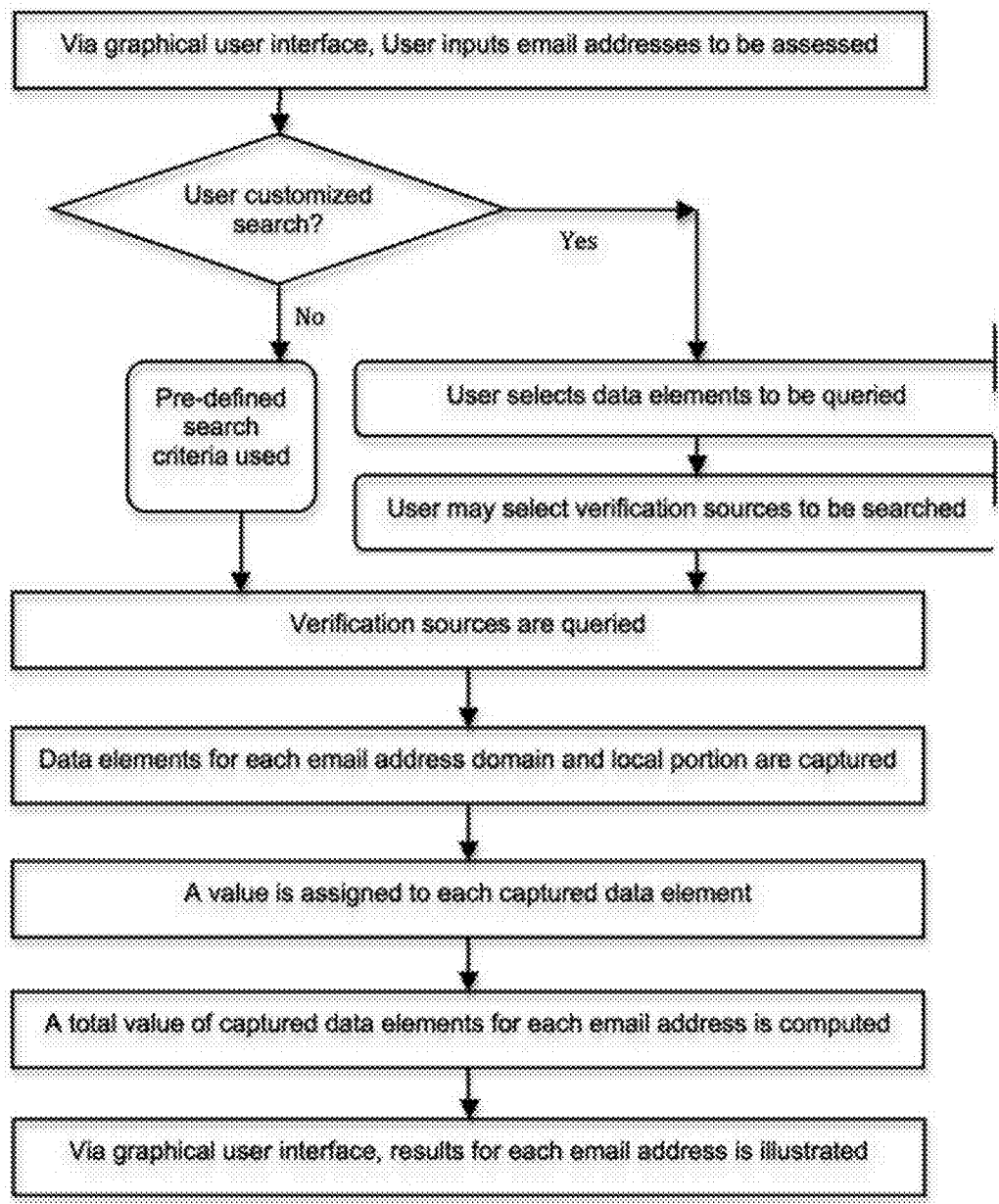
FIG. 1 illustrates a method embodying features of the present disclosure for a system and method for email fraud risk assessment.

FIG. 1 illustrates a preferred method to assess the fraud risk of email addresses. An "email address" is comprised of two portions: "local portion" appearing prior to the @ symbol of the email address; and 2) a "domain portion" appearing after the @ symbol. The present disclosure is directed to obtaining information regarding the various data elements for each portion of the email address. FIG. 4 illustrates a possible table of data elements and conditions for the "domain portion" of an email address as ascertained by an implementation of the system and method to assess the fraud risk of email addresses. FIG. 5 illustrates a possible table of data elements and descriptions for the "local portion" of an email address as ascertained by an implementation of the system and method to assess the fraud risk of email addresses.

Figure 2:
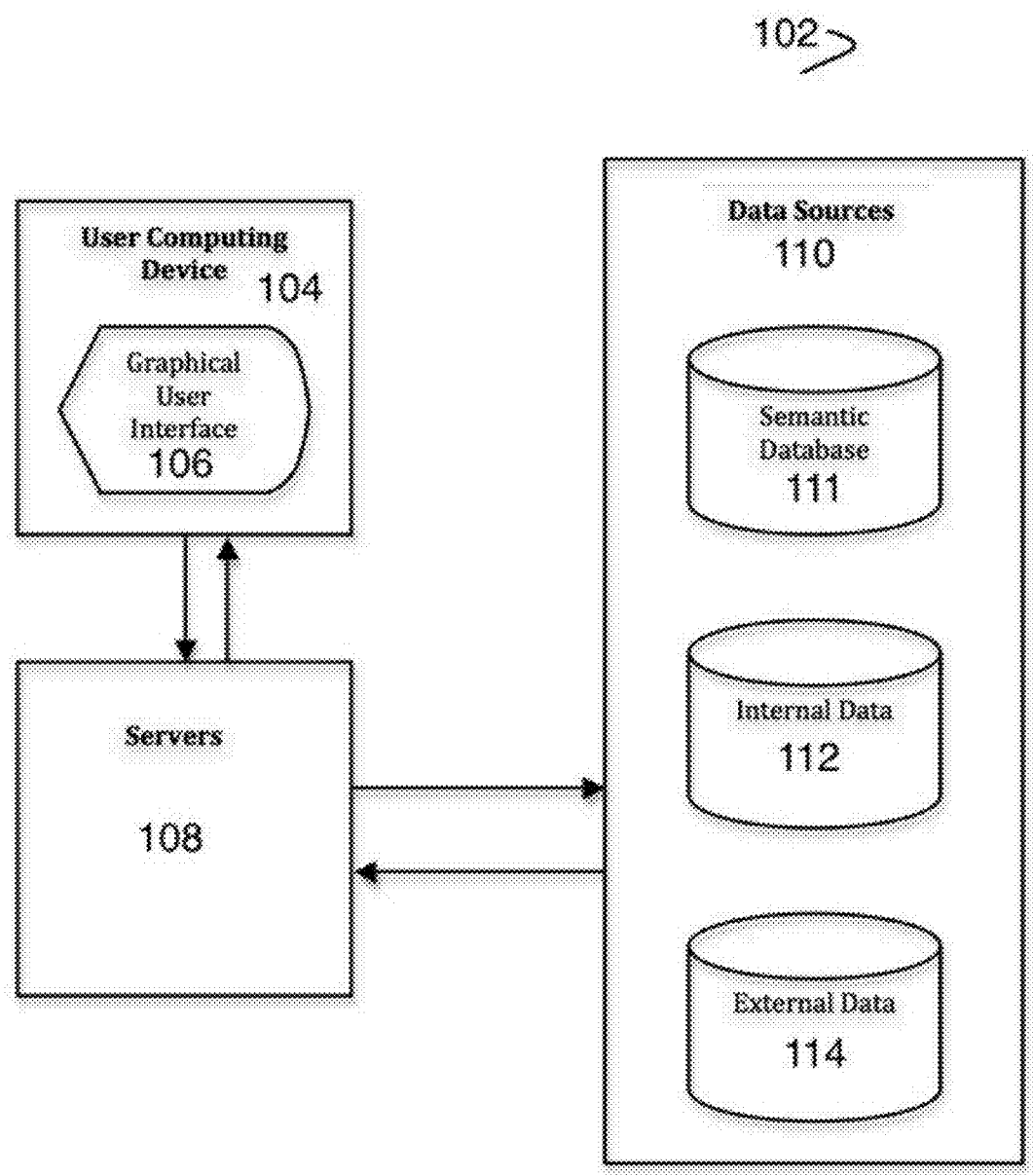
FIG. 2 is a block diagram illustrating a system embodying features of the present disclosure for a system and method for email fraud risk assessment.

In a preferred embodiment of the present system and method, the existence of an email address may be validated via the collection of data elements from various data sources 110 as illustrated in FIG. 2. The data sources 110 may include but are not limited to contacting an external data 114 sources or internal data 112 sources. Examples of contacting an external data 114 source include sending an inquiry to an Email Service Provider (ESP) or using Simple Mail Transfer Protocol (SMTP), or cross-referencing the email address via social media networks and services, search engines and API's, or publicly accessible services such as those available through a query and response protocol. Examples of an internal data 112 source include proprietary or non-proprietary database of local Domains information which can store data such as an email repository with historical information as well as a domain name "blacklist" associated with previously discovered fraudulent email addresses. The internal data 112 may also include a list of email addresses that is managed by the system or when the user has manually marked as fraudulent or credible. This data may then be accessed during implementation of the present disclosure to prevent recurring examination of an email address. One of ordinary skill in the art will recognize that any additional sources of email data may also be used by implementations of the system.

In an embodiment of the present disclosure, once an email address has been obtained by the system, the authentication and verification process begins by querying a proprietary or non-proprietary database 111 to determine whether any information has previously been collected regarding the email address. If the email address is found in the database 111 with a positive status or is "certified", wherein the email address has been determined to exist and has a recorded creation date, the process may end at this stage and the information from the database 111 will be used. Otherwise, in some implementations, the system may move to an additional stage to collect more details about the email address.

The external data 114 source inquiry may be sent to one or more Email Service Providers (ESP) to verify when the email address was created. If the information is retrieved successfully, the best available email creation date may be set as the "member since date" of the account, which means the date when the email account was created. If no or if inadequate information is found for the email address in the ESP stage, in some implementations, the process may moves to a the next external data 114 source.

A Simple Mail Transfer Protocol (SMTP) query for an email creation date may also be used to validate the existence of an email address. If the email address is determined to exist, or if for any reason the system is not able to get reasonable and reliable information from this service, the data sourcing process may then progress to an additional stage.

One or more inquiries may be sent to large external data repositories as well as corporate and social media services to determine the first time the email address has appeared in one or more sources. A combination of the first posting date associated with the email address and the creation date of the external data repositories and corporate and social media accounts may be used as the "Email First Seen Date." If information is found for the email address in one or more sources, the system may select the oldest and most reliable information and may move to an additional step in the verification process. If no information is found, the next stage may be entered without a previous email first seen date.

In another embodiment of the present disclosure, the email address is searched using one or more search engine services. From the results of a query in one or multiple search engines, the date of the first record associated with the email address may be used as the Email First Seen Date and the process may move to another step. If no information is found for the email address via any of the queried search engines services, the process may move to the next stage without a search engine email first seen date.

In yet another embodiment of the present disclosure, information for the email domain may be collected using a query and response protocol or publicly available services such as, for example Whois. One of ordinary skill in the art would recognize that an implementation of the disclosed method may be conducted in any order.

The following is a list of possible data elements and their respective definition that may be captured through various steps implemented in the present disclosure:

1. 'Email Validation'=Verification of whether the email address exists;
2. 'Email Creation Date'=Date when email address was created;
3. 'Email First Seen Date'=First date found associated with the email address;
4. 'Email Last Consultation'=Last time email address was queried on the system;
5. 'Email Owner'=Name found associated with the email address;
6. 'Email Owner DOB'=Date of birth of email address owner;
7. 'Email Owner Gender'=Gender associated with email, it could be 'Male', 'Female' or blank if the system couldn't determine during the data source stages;
8. 'Email Owner Location'=Location associated with email, values will be the location, address or blank if the system couldn't determine during the data source stages;
9. 'Email Owner Friends SM'=Number of friends from email owner on SM, values will be an integer number or blank;
10. 'Email Owner Photo'=Image of email address owner.
11. 'Email Hits' Number of consultations for the email address performed by any user;
12. 'Email Unique Hits'=Number of consultations for the email address performed by different companies;
13. 'Domain Exist'=Verification of whether the domain exists;
14. 'Domain Creation Date'=Date when email domain was created; and
15. 'Domain Country'=Country of origin for the domain.

After verification and data element collection for each email address, an optional prioritization process may be initiated. The prioritization process may be conducted to sort the data element information from most to least important. An example of such a prioritization order may appear as: 1) email address found on proprietary database and flagged as certified; 2) ESP has provided account information; 3) the oldest email activity date was found on social media and on search engines; and 4) domain details captured via a database of domain names and other publicly available services. It should be recognized that any other priority order may also be used and that this priority order may be customized to tailor the results according to user preferences.

A scoring logic is then implemented to compute a "Fraud Risk Score" of each email address, the computation may take place on a user computing device 104. To determine the Fraud Risk Score, a value is assigned to each data element. The value is based on a predetermined or user specified scale that takes into account the type and source of the data element information. The following provides an example of a scale that may be used to assign a Fraud Risk Score and shows the score on the left with an exemplary characteristic that an email address may have to be assigned such a score listed on the right:

- 975—Very High - - - Email address previously marked as fraud by multiple users.
- 930—Very High - - - Email address recently created.
- 850—High - - - Email address is from a high-risk domain.
- 805—High - - - Email address linked to high risk Social Media account.
- 803—High - - - Email domain from high-risk country or from semantic database fraud domain list.
- 800—High - - - Email domain recently created.
- 710—Review - - - Email address does not exist anymore.
- 708—Review - - - Email address does not exist.
- 700—Review - - - Email domain does not exist.
- 500—Moderate - - - Email address creation date/first seen date between a certain pre-defined period.
- 350—Low - - - Email address linked to low risk Social Media account.
- 300—Low - - - Email address creation date/first seen date between a certain pre-defined period.
- 100—Very Low - - - Email address creation date/first seen date with a certain pre-defined period.

While the above example provides a scale in which a higher Fraud Risk Score indicates a higher likelihood of an email address being unreliable and/or fraudulent, one of ordinary skill in the art would also recognize that a numeric or other scale may be used in which a lower Fraud Risk Score indicates a higher likelihood that the email address is fraudulent.

Figure 3:
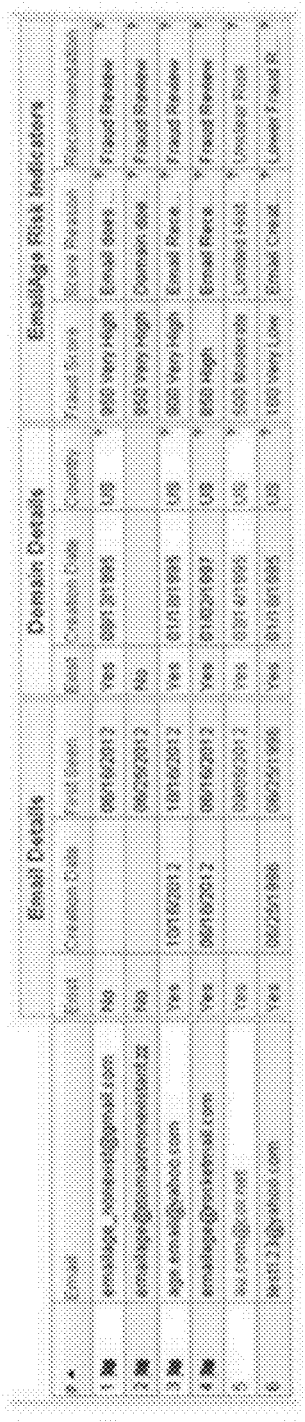
FIG. 3 illustrates a visual depiction of a results page embodying features of the present disclosure for a system and method for email fraud risk assessment.

As illustrated in FIG. 3, a graphical user interface 106 may display the Fraud Risk Score for each email address. In addition to the Fraud Risk Score, a description or explanations for the particular Fraud Risk Score of each email address may be displayed to assist the user understand the results. The description or explanation takes into consideration information collected during the verification and data element search. The following is an example of messages that may be displayed:

1. 'Fraud Level X': X is the number of users that previously marked the email address as fraud.
2. 'Email does not exist': Status 'Email Nonexistent'.
3. 'Domain does not exist': Status 'Domain Nonexistent'.
4. 'Risky Domain': Email address is from a high-risk domain.
5. 'Email Recently Created': Status='Certified' and Email-age equal or less than a certain pre-defined period.
6. 'Risky Country': Email domain belongs to list of risk countries.
7. 'Limited History for Email': Email address creation date/first seen date for a certain pre-defined period.
8. 'Low Risk Domain': email domain belongs to list of low risk domains.
9. 'Email Linked to High Risk Media Account': email address was recently linked to a new Social Media account with a lower number of social media friends.
10. 'Email Linked to Low Risk Media Account': email address was recently linked to a new Social Media account with a high number of social media friends.
11. 'Email Created At Least XX Years Ago': where XX is the age of the email address, when creation date/first seen date is older than a certain pre-defined period.

The graphical user interface 106 may also display a recommendation based on one or more threshold limits directly related to the risk associated with an email address. For example, if a Fraud Risk Score is greater than or equal to 800, the system may display a message such as, 'Fraud Review' or 'Review for Potential Fraud Risk', indicating that the user may wish to further investigate the authenticity of the email address. In another example, if a Fraud Risk Score between 450 and 550 is assigned, the system may display a message such as 'Unclear Risk' or 'Unclear Risk at this point due to limited email history' indicating that the user may wish to undertake further process steps in an attempt to further verify the email address. In yet another example, if a Fraud Risk Score is less than or equal to 300, the system may display a message such as 'Low Fraud Risk' or 'Low Fraud Risk due to email history' indicating that the user may have a high degree of confidence that the email address is credible.

In places where the description above refers to particular implementations of computerized systems and methods for email fraud risk assessment and credibility rating, it should be readily apparent that a number of modifications may be made without departing from the spirit thereof and that these implementations may be applied to other embodiments of email risk assessment and credibility rating systems and methods All features disclosed in this specification, including any accompanying claim, abstract, and drawings, may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, paragraph 6. In particular, the use of "step of" in the claims herein is not intended to invoke the provisions of 35 U.S.C. §112, paragraph 6.

Although preferred embodiments of the present invention have been shown and described, various modifications and substitutions may be made thereto without departing from the spirit and scope of the invention. Accordingly, it is to be understood that the present invention has been described by way of illustration and not limitation.

What is claimed:

1. A method of assessing email address data elements from numerous sources, validating and verifying the existence of email addresses, and calculating and describing fraud risk indicators for email addresses, the method comprises at least one processor or at least one firmware application configured to:

(a) enable a user to input at least one email address into a graphical user interface, select at least one data element to be queried for each email address, and select at least one internal or external source to be searched for each email address;
(b) query the internal data source for email addresses that the user has manually marked as fraudulent or credible, and if nor result is found, query the external data source;
(c) capture the at least one data element for each email address from the at least one data source;
(d) assign a value to each captured data element;
(e) compute a total value of captured data elements for each email address;
(f) illustrate results for each email address through the graphical user interface; and
(g) provide a recommendation to the user based on pre-defined threshold limits;

wherein selecting an external data source involves cross-referencing the email address via social media networks and services, third-party proprietary database and application programming interface (API), or via publicly accessible services available through a query and response protocol; and wherein the captured data elements include the following to assess the risk of fraud: Email Validation to verify whether the email address exists, Email Creation Date, Email First Seen Date, Email Last Consultation, Email Owner, Email Owner Date of Birth, Email Owner Gender, Email Owner Location, Email Owner Friends SM, Email Owner Photo, Email Hits, Email Unique Hits, Domain Exist to verify whether a domain exists, Domain Creation Date, and Domain Country.

2. The method of claim 1, wherein the at least one processor or at least one firmware application selects data elements for a domain portion of the at least one email address.

3. The method of claim 1, wherein the at least one processor or at least one firmware application selects data elements for a local portion of the at least one email address.

4. The method of claim 1, wherein an Email Service Provider, Simple Mail Transfer Protocol, or Search Engine, is used to query an external data source for an email creation date.

5. The method of claim 1, wherein an Email Service Provider, Simple Mail Transfer Protocol, or Search Engine, is used to query an external data source for an Email First Seen Date; said Email First Seen Date being calculated based on a combination of a first posting date associated with the email address and the creation date of external data repositories, and corporate and social media accounts.

\* \* \* \* \*